United States Patent [19]

Chen

[11] Patent Number: 5,452,597
[45] Date of Patent: Sep. 26, 1995

[54] AUTOMOBILE STEERING LOCK

[76] Inventor: Hsien-Paul Chen, No. 76, Lane 274, Jung-Jeng S. Road, Yung-Kang Shiang, Tainan Hsien, Taiwan

[21] Appl. No.: 290,557

[22] Filed: Aug. 15, 1994

[51] Int. Cl.⁶ .................................................. B60R 25/02
[52] U.S. Cl. .................................... 70/209; 70/226
[58] Field of Search ..................... 70/209, 211, 212, 70/225, 226, 237, 238

[56] References Cited

U.S. PATENT DOCUMENTS

| | | | |
|---|---|---|---|
| D. 348,203 | 6/1994 | Chen | D8/331 |
| 5,095,723 | 3/1992 | Lin | 70/209 |
| 5,163,309 | 11/1992 | Wu | 70/209 |
| 5,168,732 | 12/1992 | Chen et al. | 70/209 |
| 5,293,762 | 3/1994 | Kuo | 70/238 |
| 5,347,836 | 9/1994 | Chen | 70/209 |
| 5,353,615 | 10/1994 | Chen | 70/209 |
| 5,375,441 | 12/1994 | Liou | 70/209 |

*Primary Examiner*—Lloyd A. Gall

[57] ABSTRACT

An automobile steering lock has a housing including a lock base and a plate base, an elongate stop rod, a slidable curved stop plate, a lock and a locking pin assembly combined together. The slidable plate fits in and is slidable in and out of a plate hole of the plate base and is provided with a recess fitted with a plurality of engaging blocks each having a vertical face and an inclined face to be engaged by a bottom end of a locking pin of the locking pin assembly. The locking pin slides over when the slidable plate is pushed inward but prevents the plate from being pulled outward. The housing has a lateral wheel opening for a portion of a steering wheel. The slidable plate is pushed inward in the plate hole to close over a lower side of the steering wheel with the lock in a locked position.

3 Claims, 7 Drawing Sheets

5,452,597

AUTOMOBILE STEERING LOCK

BACKGROUND OF THE INVENTION

This invention concerns an automobile steering lock, more particularly to one which surrounds a portion of the steering wheel of an automobile and prevents the steering wheel from being rotated by an elongate rod extending along the instrument panel to a corner of the windshield.

Nowadays many kinds of automobile steering locks are known. A known conventional automobile steering lock shown in FIG. 1, for example, comprises an elongate tubular member 10, a lock housing and an elongate rod member 16 combined together. The lock housing has a steel ball 11, a spring 12 and a cap 13 deposited in one side and a lock 14 on an upper side. A hook 15 is provided on the tubular member 10, and another hook 160 at a front end of rod member 16. The rod member 16 has a plurality of annular grooves 161, telescoping in the tubular member 10 to enable the two hooks 15, 160 to be hooked on the steering wheel of an automobile and locked at an adjusted locked position of the rod member 16.

FIG. 2 shows this conventional steering lock used on the steering wheel of an automobile. In use, this lock is to be placed on the steering wheel, and the hook 15 is made to hook a point of the steering wheel. Next, the rod member 16 is pulled outward from the tubular member 10 to hook the hook 160 on another point of the steering wheel at the hooked position, with the end of the tubular member extending to a corner of the windshield, preventing the steering wheel from being rotated.

This conventional steering lock has drawbacks as follows:

1. The two hooks have to be welded on the tubular and the rod member, taking time and high cost; and, 2. When it is locked on the steering wheel of an automobile, the steering wheel still has some rotatable space, as the end of the tubular member extends to the windshield or to the foot of a driver.

SUMMARY OF THE INVENTION

An object of this invention is to offer a kind of automobile steering lock with more stability, accuracy and, a simpler structure.

A main feature of the present invention lies in a wheel opening with two stop members provided in a housing which has a lock base for depositing a lock and a locking pin assembly, and a plate base under the lock base. The plate base has a plate hole for a slidable curved stop plate to fit and slide in and out therein. The slidable stop plate has a recess in an upper surface, with a plurality of engaging blocks in the recess. Each engaging block has a vertical face and an inclined face abutting rearward to the vertical face. The slidable stop plate has an elongated slot respectively at both sides of the recess, an elongated convex projection on a bottom surface, a generally cylindrical portion respectively at both sides, a rear hole in each cylindrical portion and a spring fitted in the hole. A cylindrical hole abuts respectively at both sides of the plate hole and a stop wall is located at the rear end of the cylindrical holes. An elongated concave surface is provided in an intermediate portion of the lower side wall defining the plate hole, and a locating pin hole respectively provided on both sides of the concave surface for a locating pin therein.

DETAILED DESCRIPTION OF THE INVENTION

Figure 1:
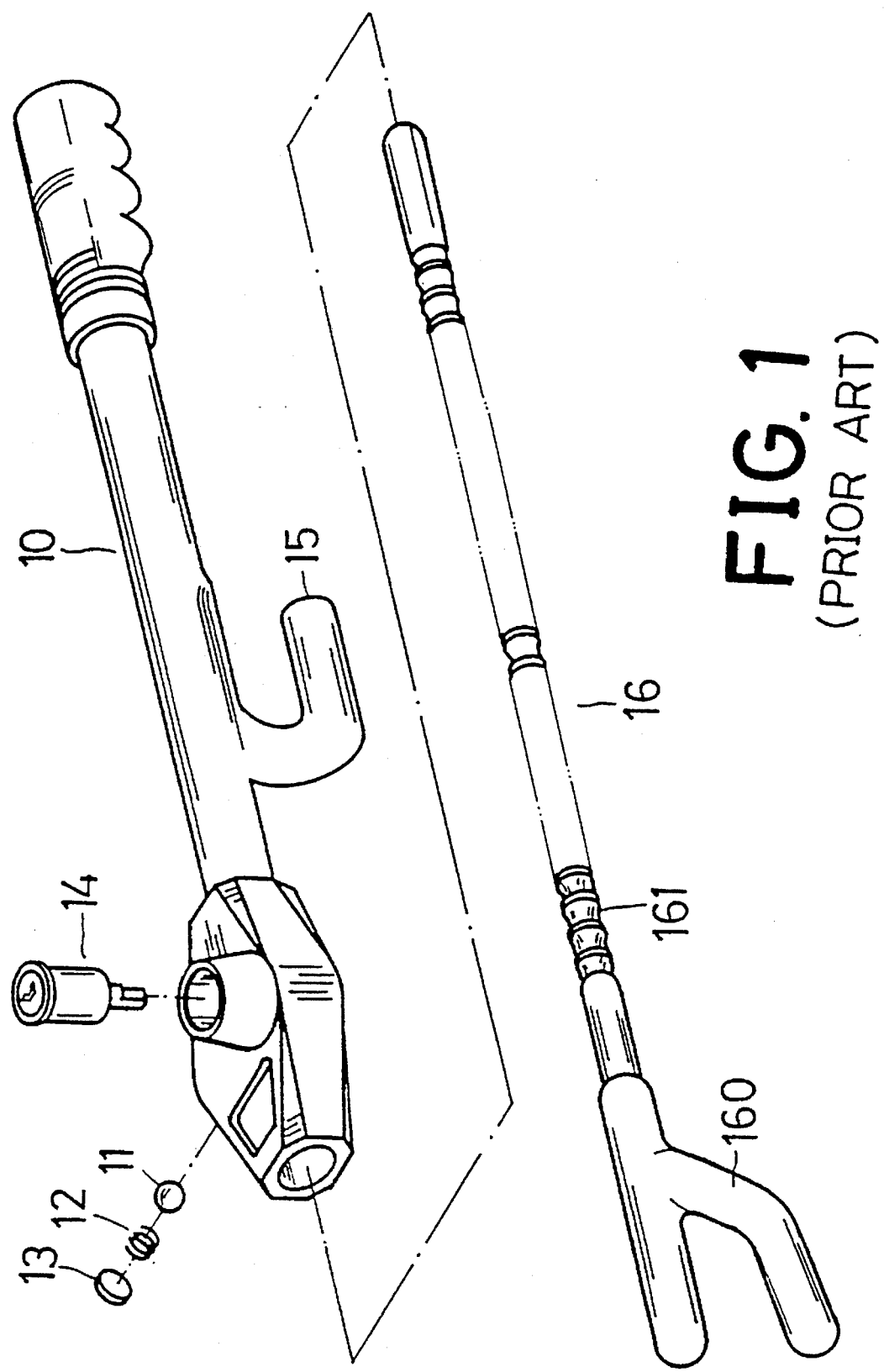
FIG. 1 is an exploded perspective view of a conventional automobile steering lock.
Figure 2:
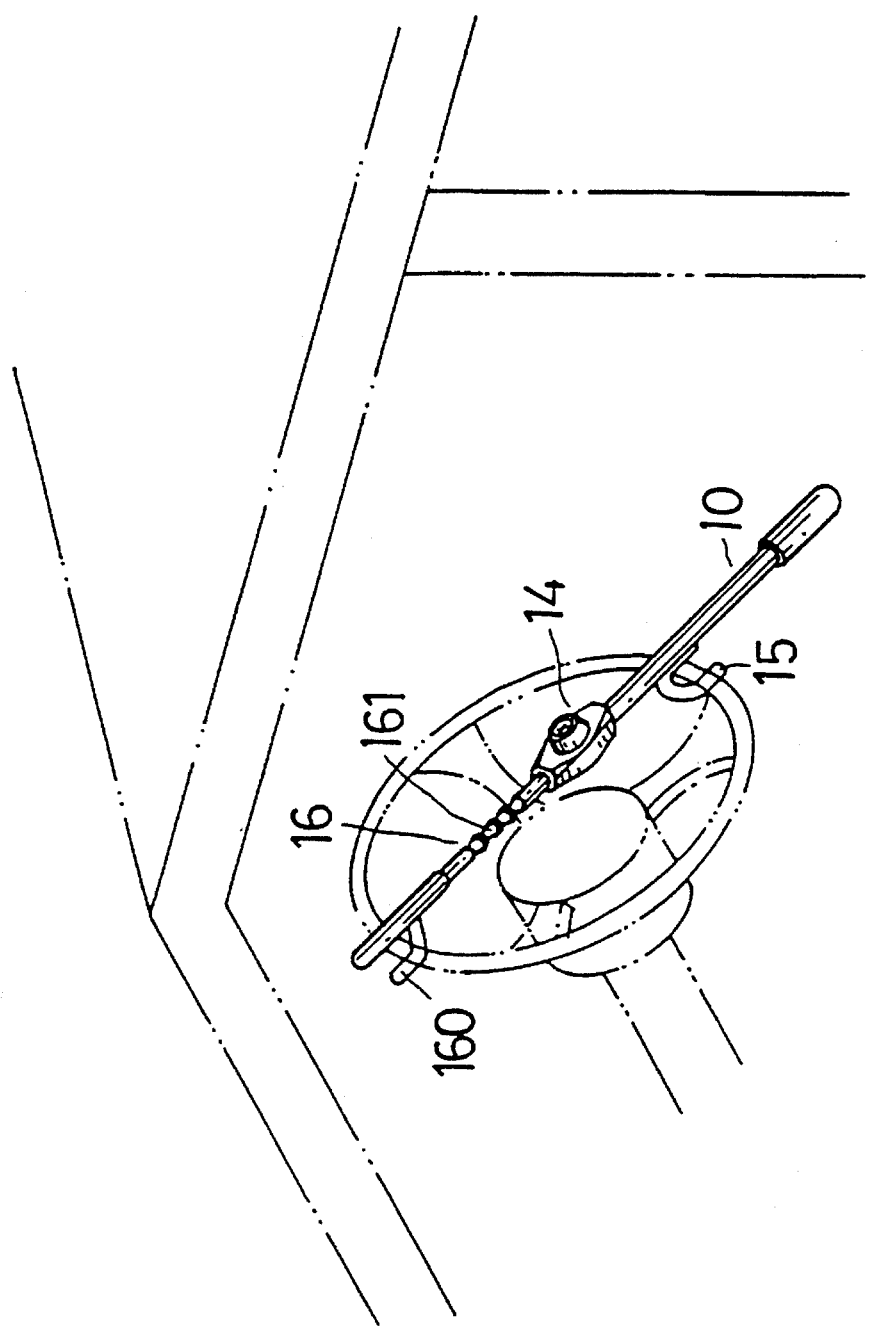
FIG. 2 is a perspective view of the conventional automobile steering lock used on a steering wheel.
Figure 3:
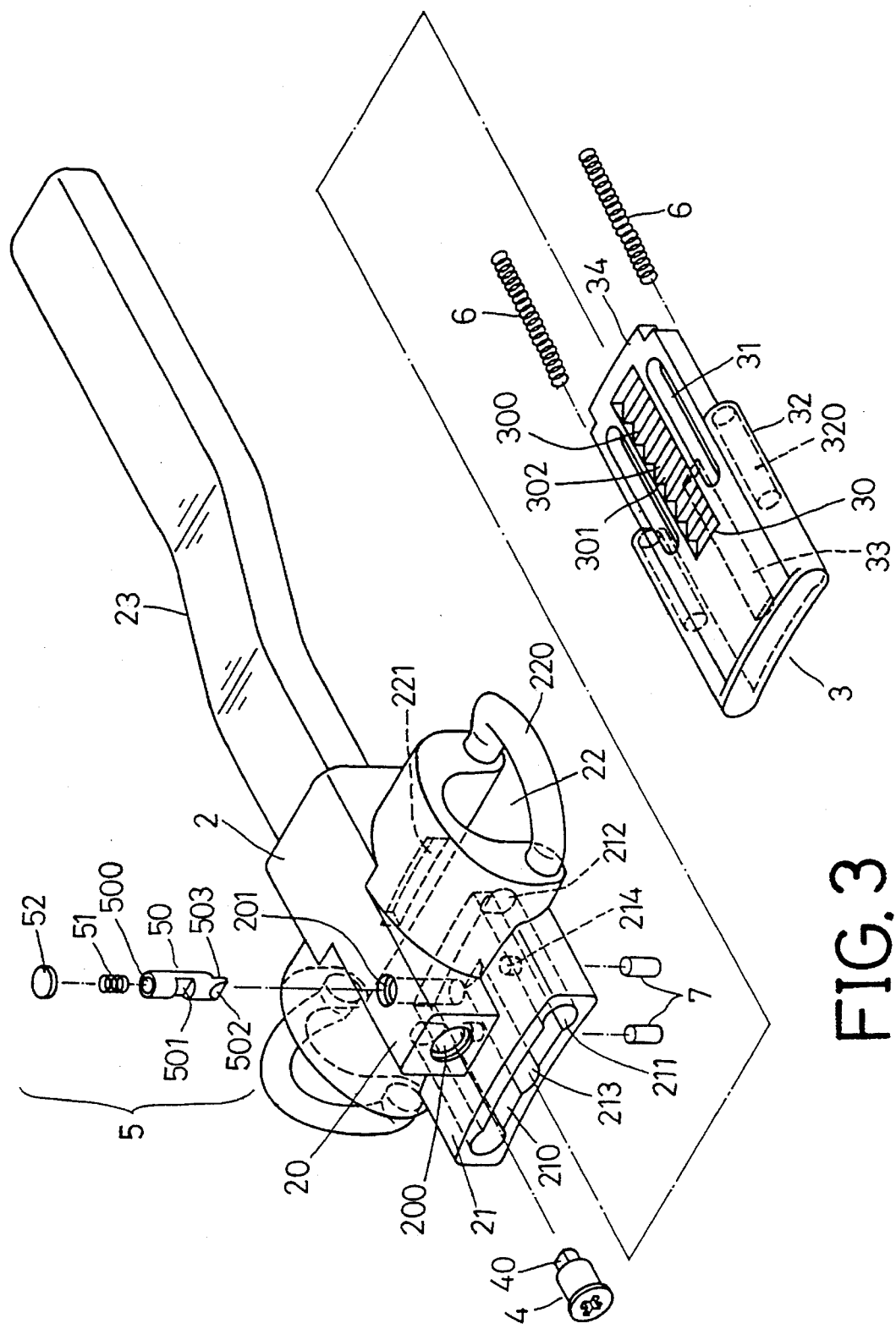
FIG. 3 is an exploded perspective view of an automobile steering lock in the present invention.

An automobile steering lock in the present invention, as shown in FIG. 3, comprises a housing 2, an elongate rod 23, a slidable curved stop plate 3, a lock 4, and a locking pin assembly 5 combined together.

The housing 2 has a lock base 20 of a square cross-sectional shape at the front portion, and the lock base 20 has a horizontal lock hole 200 for fitting the lock 4 therein, a vertical pin hole 201 communicating with the lock hole 200, a horizontal curved plate base 21 provided under the lock base 20 and having an elongated curved hole 210 with a generally cylindrical hole 211 abutting to its right and left side, the cylindrical holes 211 having inner end walls 212, an elongated concave recess 213 on a bottom wall defining the hole 210, a locating vertical hole 214 respectively provided near both sides of the rear end of the concave recess 213. The housing 2 also has a semi-round wheel opening 22 laterally facing down to fit around a portion of a steering wheel of an automobile, and two stop members 220 provided at both outer ends of the wheel opening 22, a horizontal slot 221 provided in a rear side wall defining the opening 22 and aligned to the hole 210 of the curved plate base 21. The elongate rod 23 is provided firmly to extend from a rear end of the housing 2.

The slidable curved stop plate 3 is shaped as the curved plate hole 210 so as to fit in the hole 210 of the curved plate base 21 to reach the horizontal slot 221, having a rectangular lengthwise recess 30 in an upper surface, and a plurality of engaging blocks 300 fitted in the recess 30. Each engaging block 300 has a vertical face 301 and an inclined face 302 abutting rearward to the vertical face 301. The slidable stop plate 3 also has a straight slot 31 respectively provided parallel to both sides of the recess 30, an elongated convex projection 33 on a bottom surface to fit in the concave surface 213 of the plate base 21, a generally cylindrical portion 32 respectively at the two opposite length-wise sides to fit in the cylindrical holes 211,211 of the curved plate base 21, a rear cylindrical hole 320 in the cylindrical portion 32 and a straight stop rear end 34.

The lock 4 is of a conventional structure, deposited in the lock hole 200 of the lock base 20, having a semi-round projection 40 extending from a rear end.

The locking pin assembly 5 is deposited in the pin hole 201 of the lock base 20, having a locking pin 50, a spring 51 and a cap 52. The lock pin 50 has a hole 500 in an upper end, a notch 501 in an intermediate portion, a sloped face 502 and an L-shaped face 503 at a lower end. The spring 51 fits in the hole 500 and the cap 52 closes the pin hole 201.

Two springs 6, 6 are provided to fit in the cylindrical holes 320,320 of the curved stop plate 3, to elastically urge the slidable curved stop plate 3 to push the plate 3 outward with elasticity after being compressed when the plate is pushed in.

Two locating pins 7, 7 are provided to fit in the pin holes 214, 214 of the housing 2 and in the parallel slots 31, of the slidable curved stop plate 3, allowing the stop plate 3 to move in and out within the distance of the slots 31,31.

Figure 4:
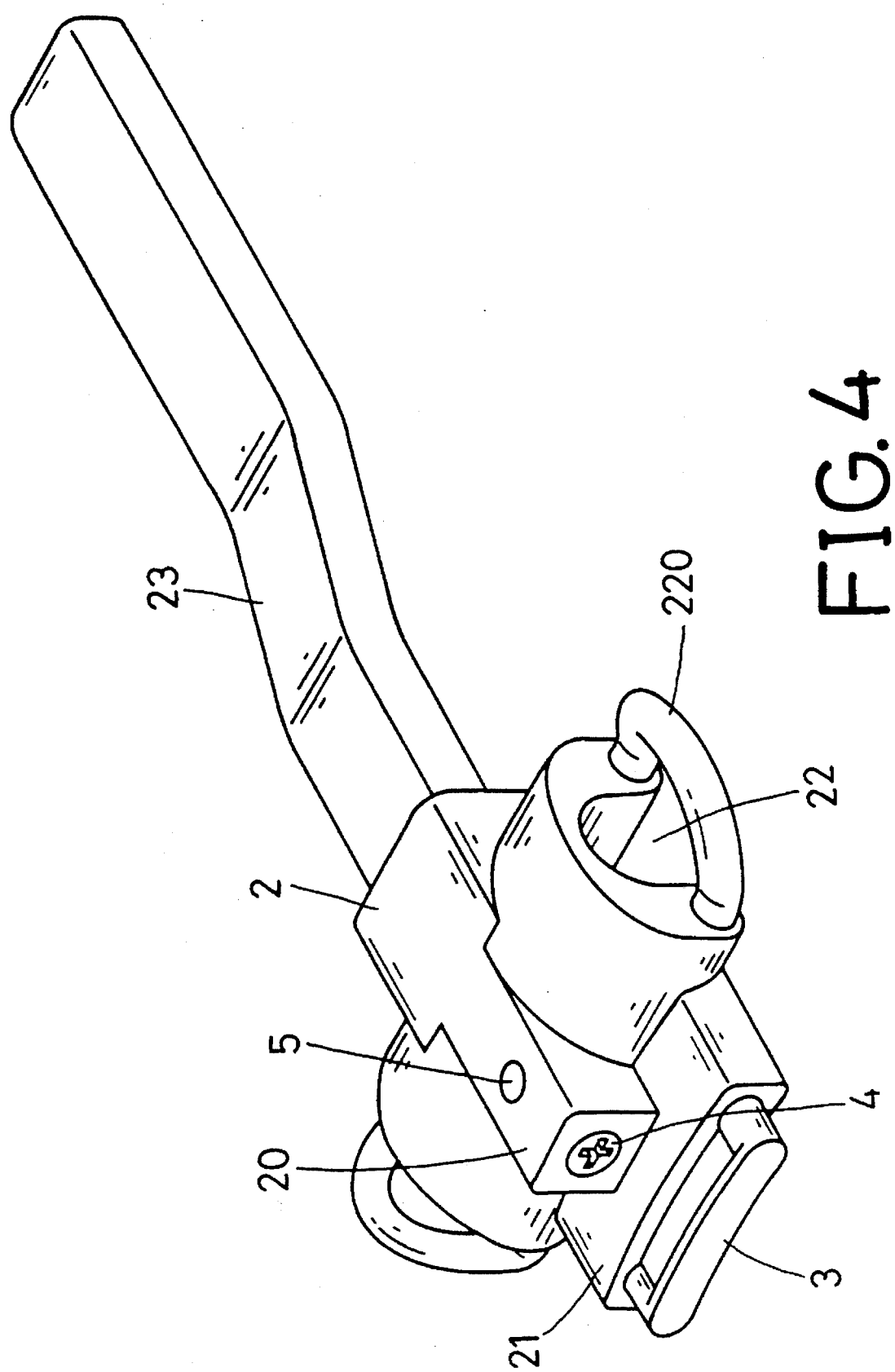
FIG. 4 is a perspective view of the automobile steering lock in the present invention.

In assembling, referring to FIG. 4, firstly, the two springs 6, 6 are inserted in the spring holes 320, 320 of the two cylindrical side portions 32, 32 of the slidable curved plate 3. Next, the, slidable plate 3 is fitted in the curved hole 210 of the plate base 21, letting the rear ends of the springs 6, 6 rest on the bottom wall 212 of the cylindrical holes 211 of the plate base 21. Then the two locating pins 7, 7 are firmly fitted in the locating holes 214, 214 and in the slots 31,31 of the slidable plate 3 to limit the slidable distance of the plate 3. After that, the locking pin 50 and the spring 51 are orderly inserted in the pin hole 201 of the lock base 20, with the cap 52 firmly fitted in the opening of the hole 201. Lastly, the lock 4 is deposited in the lock hole 200, letting the semi-round projection 40 fit in the notch 501 of the pin 50. Then this lock is assembled completely, ready for use.

Figure 5:
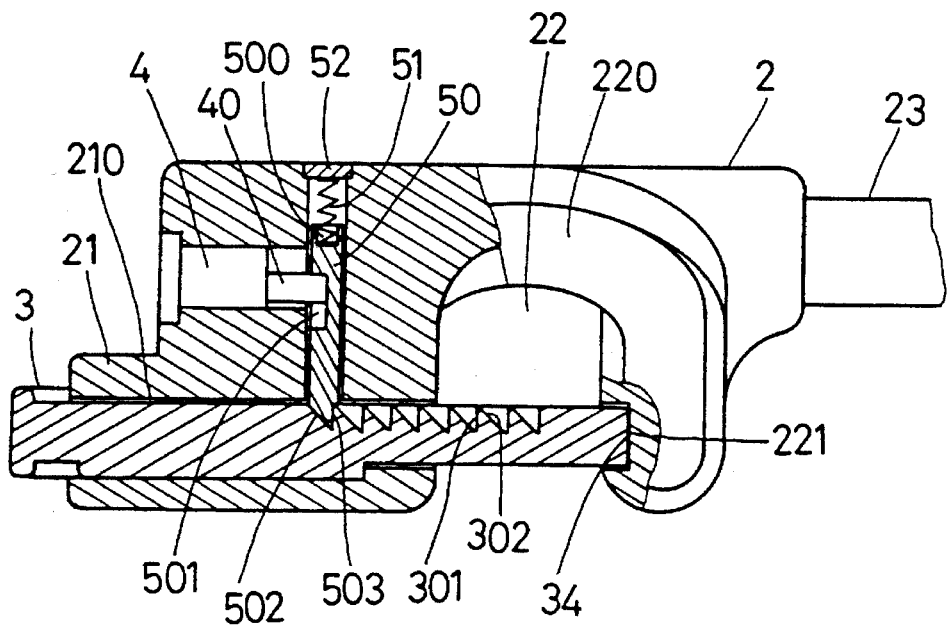
FIG. 5 is a cross-sectional view of the automobile steering lock in the present invention, showing it in locked position.
Figure 8:
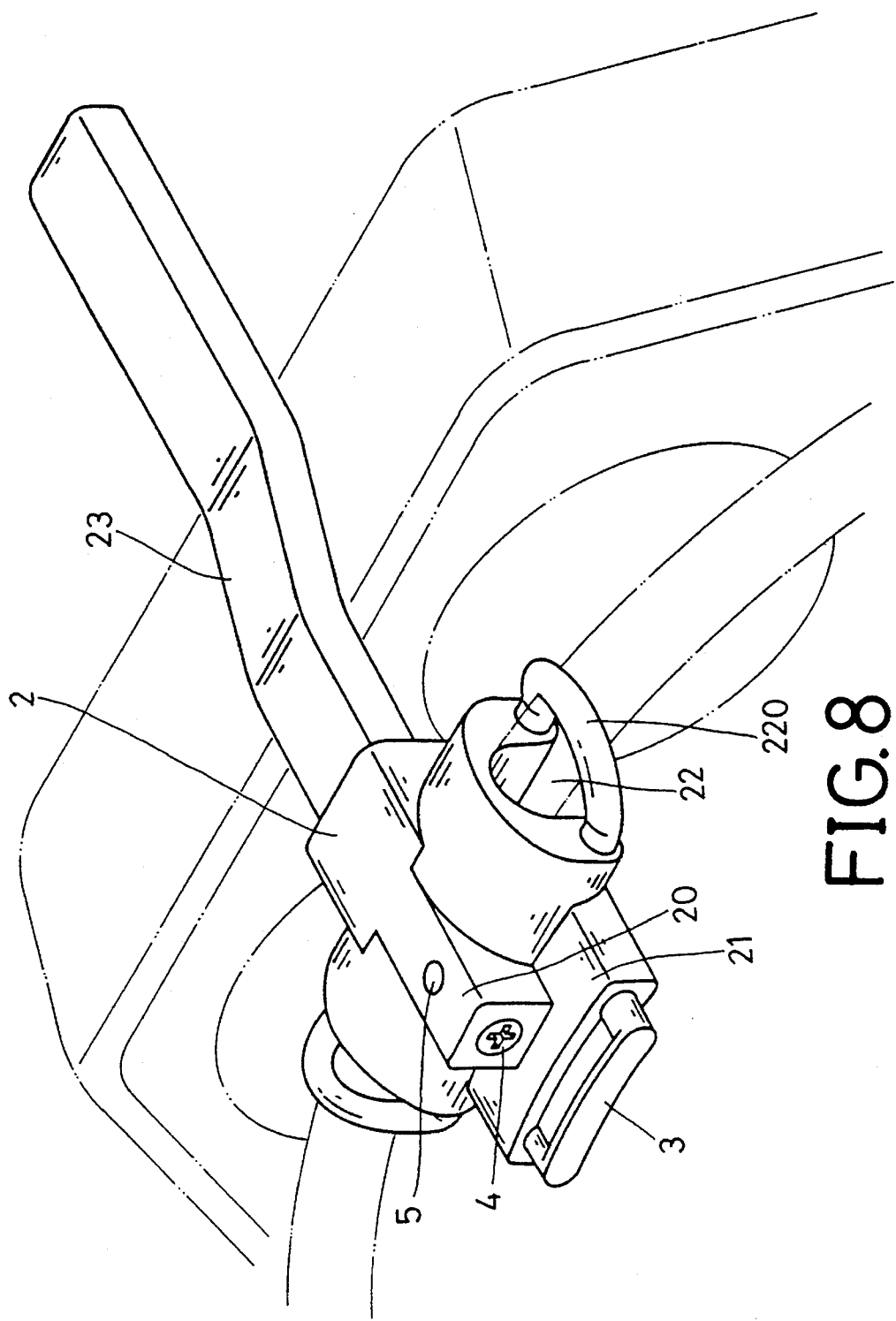
FIG. 8 is a perspective view of the automobile steering lock in the present invention, showing it used on a steering wheel.

If this lock is to be locked on the steering wheel of an automobile, referring to FIGS. 5 and 8, the lock 4 is made in locked position with a key. Firstly, the wheel opening 22 is made to fit around on a portion of the steering wheel of an automobile, and then the bottom end of the locking pin 50 touches on one of the inclined faces 301 of the engaging blocks 30 by elasticity of the spring 51. In case the slidable stop plate 3 is pushed inward in the hole 210, the bottom end tip will slide over the inclined faces 302 by means of elasticity of the spring 51, but in case the slidable plate 3 is pulled outward of the hole 210, the L-shaped faces 503 of the bottom end of the locking pin 50 will stop any of the vertical faces 301 of the engaging blocks 300. Although the lock 4 is in a locked position, the slidable plate can still be pushed inward until the rear stop end 34 fits in and is stopped by the horizontal slot 221 of the wheel opening wall, with the upper surface of the slidable plate 3 locating under the lower side of the portion of the steering wheel. Meanwhile, the elongated convex projection 33 and the cylindrical end sides 32, 32 slide along the concave surface 213 and the cylindrical side holes 211,211 of the plate base 21 of the housing 2. The rear ends of the cylindrical end sides 32, 32 of the slidable plate 3 are stopped by the end walls 212, 212 of the holes 211, 211, with the springs 6, 6 being compressed. At the same time the front ends of the slots 31,31 are also stopped by the locating pins 7, 7 firmly stopping the slidable plate 3 in a locked position. In sliding movement the slidable plate 3 never sways or moves to and fro, and the curvature of the plate 3 also conforms with that of the steering wheel, preventing this lock from being swung up. In addition, the two stop members 220, 220 at both sides of the opening 22 rest on the upper surface of the steering wheel, to catch hold of the steering wheel, and with the elongate rod 23 extending on the instrument panel and to the corner of the windshield, preventing the steering wheel from rotating any more at all.

Figure 6:
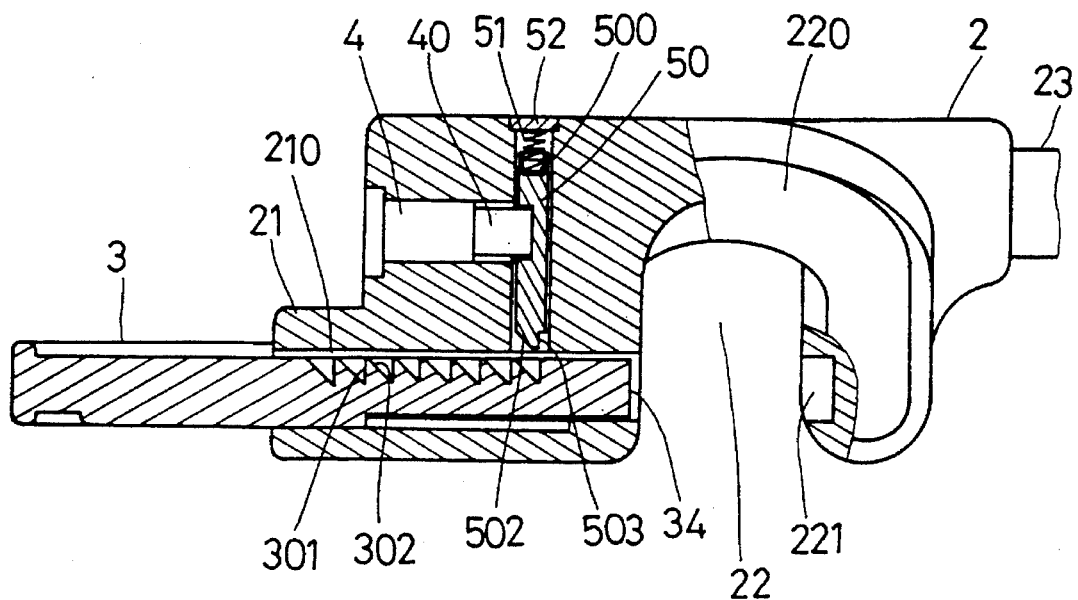
FIG. 6 is a cross-sectional view of the automobile steering lock in the present invention, showing it in unlocked position.
Figure 7:
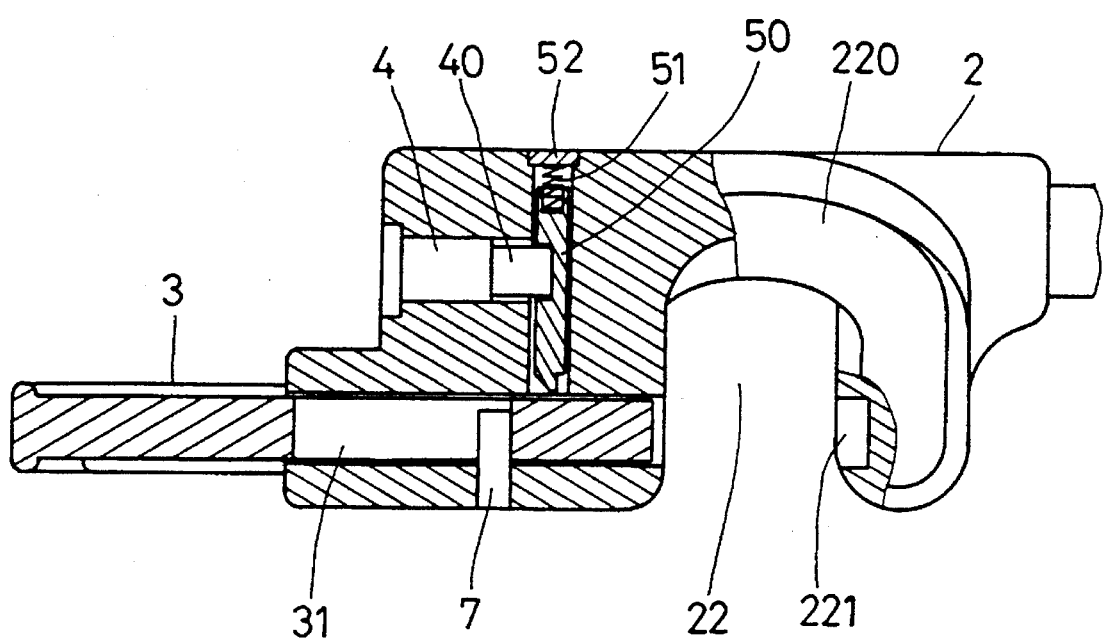
FIG. 7 is a cross-sectional view of the relative position of a slot of a slidable plate and a locating pin in the automobile steering lock in the present invention.

If this lock is to be taken down from the steering wheel after locked thereon, referring to FIG. 6, the lock 4 is rotated by a key for 90 degrees, moving up the rear semiround projection 40, causing the locking pin 50 to move up with the spring 51 compressed and the bottom end of the pin 50 disengaged from one of the engaging blocks 300. Then the slidable plate 3 is automatically pushed outward by elasticity of the springs 6, 6, with the elongated convex projection 33 and the cylindrical end sides 32, 32 sliding along the concave surface 213 and the two cylindrical side holes 211,211 until the rear ends of the slots 31,31 are stopped by the locating pins 7, 7 as shown in FIG. 7. Then the lock can be taken off the steering wheel.

As can be realized from the above description, this lock has advantages as follows:

1. It can never be swung up after being locked on the steering wheel of an automobile by means of the wheel opening 22 and the stop plate firmly and closely surrounding the steering wheel, preventing the steering wheel from moving at all; and 2. The slidable curved stop plate 3 never moves or sways at all in sliding in or out of the holes 210 and 211,211, enabling the lock to be locked or unlocked swiftly and conveniently.

What is claimed is:

1. An anti-theft device for attachment to a steering wheel of an automobile comprising:

a housing having a lock base at a front portion, a curved wheel opening facing downwardly for fitting around a portion of a steering wheel, an elongate stop rod extending from a rear portion, said lock base having a lock hole for depositing a lock therein, and a locking pin hole communicating with the lock hole;

a lock affixed in said lock hole of the lock base, the lock having a semi-round projection extending therefrom a locking pin assembly located in said locking pin hole comprising a locking pin, a spring, and a cap fixed in an opening of said locking pin hole, said locking pin having a hole in an upper end, a notch in an intermediate portion, and an inclined face and an L-shaped face oppositely formed in a bottom end;

a stop member respectively provided at both ends of said wheel opening;

a curved plate base under said lock base having a plate hole;

a slidable curved stop plate fitted in said plate hole so as to be movable inward and outward therein, said slidable curved stop plate having a recess in an upper surface and a plurality of engaging blocks in the recess, each engaging block provided with a vertical face and an inclined face abutting rearward to a vertical face, a slot provided respectively at both sides of said recess of the slidable plate, said slidable plate provided with an elongated convex projection on a bottom surface and with two opposite generally cylindrical sides each with a spring hole in which is located a spring; a generally cylindrical hole at each opposite side of the plate hole; a stop wall at a bottom of each said generally cylindrical hole; an elongated concave surface on a lower side of the plate hole; a pin hole provided adjacent to opposite sides of the elongated concave surface for a locating pin to fit therein; whereby said slidable plate is pushed inward in the plate hole of the curved plate base of the housing to lock in a locked position for closing a lower side of the portion of the steering wheel fitted in said wheel opening, said two stop members of the wheel opening of the housing press the steering wheel, such that said elongate stop rod prevents the steering wheel from rotation with its end extending to a corner of a windshield.

2. The anti-theft device for attachment to a steering wheel of an automobile as claimed in claim 1, wherein said plate hole of said plate base of said housing and said slidable curved stop plate have the same cross-sectional curvature.

3. The anti-theft device for attachment to a steering wheel of an automobile as claimed in claim 1, further comprising a lateral slot formed in a rear wall of the housing defining the wheel opening to accommodate an end of the slidable plate in its locked position.

* * * * *